United States Patent
Costa

(10) Patent No.: US 7,422,663 B2
(45) Date of Patent: Sep. 9, 2008

(54) DESALINATION MACHINE

(76) Inventor: Sergio Martins Costa, Av. dos Navegantes, 137-CP 233, Imbituba, SC 88780-000 (BR)

(*) Notice: Subject to any disclaimer, the term of this patent is extended or adjusted under 35 U.S.C. 154(b) by 0 days.

(21) Appl. No.: 10/563,467

(22) PCT Filed: Aug. 1, 2003

(86) PCT No.: PCT/BR03/00108

§ 371 (c)(1),
(2), (4) Date: Jan. 4, 2006

(87) PCT Pub. No.: WO2005/012184

PCT Pub. Date: Feb. 10, 2005

(65) Prior Publication Data

US 2006/0231377 A1  Oct. 19, 2006

(51) Int. Cl.
*B01D 1/26* (2006.01)
*B01D 3/28* (2006.01)
*C02F 1/04* (2006.01)

(52) U.S. Cl. .............. 202/174; 159/14; 159/27.3; 159/27.5; 159/DIG. 8; 159/DIG. 16; 202/173; 202/205; 202/236; 202/237

(58) Field of Classification Search .............. 159/14, 159/27.1, 27.3, 27.5, DIG. 8, DIG. 16; 202/173, 202/174, 236, 237, 205, 187
See application file for complete search history.

(56) References Cited

U.S. PATENT DOCUMENTS

| | | | | | |
|---|---|---|---|---|---|
| 3,487,873 | A | * | 1/1970 | Diamond et al. | 159/13.3 |
| 4,334,954 | A | * | 6/1982 | Lagana' et al. | 159/18 |
| 4,753,773 | A | * | 6/1988 | Garabedian et al. | 376/299 |
| 4,941,330 | A | * | 7/1990 | Williamson | 62/515 |
| 5,645,693 | A | * | 7/1997 | Gode | 202/173 |
| 5,853,549 | A | * | 12/1998 | Sephton | 203/2 |
| 6,089,312 | A | * | 7/2000 | Biar et al. | 165/118 |
| 6,309,513 | B1 | * | 10/2001 | Sephton | 202/155 |
| 6,695,951 | B1 | * | 2/2004 | Bitterly et al. | 202/182 |

* cited by examiner

*Primary Examiner*—Virginia Manoharan
(74) *Attorney, Agent, or Firm*—Fildes & Outland, P.C.

(57) ABSTRACT

A compact array of vertical rising film evaporators is disclosed in an evacuated multi-effect process, for desalination of seawater, using waste heat of thermal machines. Vapor produced in one stage is the heat source for the next. This invention is based on a concentric disposition of three different evaporators, at which the first stage is a shell and tube evaporator built in a ring format, where is inserted inside the intermediate stage that is a bundle of vertical tubes in a ring format, and the last stage that is a bundle of vertical tubes placed inside the intermediate stage. By this arrangement, vapor pipelines are eliminated, dimensions are reduced, and heat transfer is improved per the rising film evaporators compared to falling film.

12 Claims, 9 Drawing Sheets

DESALINATION MACHINE

FIELD OF THE INVENTION

The present invention relates to a distillation process using vertical tube evaporators in a multi effect process and is applicable to desalination of sea water, brackish waters and in general to any water with dissolved solids, in order to produce fresh water for oil offshore platforms, ships, and for some arid locations, using rejected waste heat of thermal machines.

BACKGROUND OF THE INVENTION

Multi-effect distillation (MED) process has been used in industry for juice evaporation, to concentrate a substance, for production of salts and for salty and marine water distillation for fresh water production. Different processes have been used worldwide for desalination, for fresh water production. Major processes commercially available are membranes (reverse osmosis and electrodialysis) and thermal. Distillation is a thermal process that can be divided in three different methods: multi-stage flash distillation (MFD); multi-effect distillation (MED) and vapor compression. These processes can be used also to concentrate a substance as the object purpose.

In the MED process, only a portion of the concentrate submitted to the heat transfer surfaces is evaporated. Each effect works in a specific equilibrium vapor pressure state. The remaining liquid of each effect, normally called brine, is the entrance feed to the next stage, where part of it flashes into vapor.

Produced vapor in one effect will give up heat to boil the liquid transferred to the next effect due to the temperature difference between them, and several constructive models have been based on the type of evaporators used and on the creative design and arrangement distinctly disclosed in many patents worldwide.

Sometimes the effects or stages have evaporators located in separate vessels, having the disadvantages of requiring a pipeline for conducting vapor from one stage to the next, and the necessity for more room, as shown in the U.S. Pat. Nos. 3,884,767, 3,261,766 and 3,021,265. When these stages are assembled in only one vessel, the construction can have the stages arranged in multi stack vertical falling film evaporators as disclosed in the U.S. Pat. Nos. 4,334,954, 6,089,312, 6,309,513, 3,487,873, and 6,089,312, all involving falling film type evaporators. Comment must be made to the Sephton (6,309,513) and Biar et al. (6,089,312) patents that are not multi-effect apparatus but a parallel stack of evaporators.

Vertical Tube Evaporators (VTE) have basically two different evaporation systems: falling film and rising film evaporation. As widely described in technical literature, falling film evaporators have high heat transfer coefficients, but the proper design of the liquid distribution system is critical to achieve full and even product wetting of the tubes, with higher risk of having so-called dry spots or film breakdown or vapor blanket, that causes a lowering of heat transfer and is the cause of plugging by scale.

Vapor compression process has the great advantage of a low energy consumption and a high energy efficiency, but has the disadvantage of higher maintenance costs associated with down-time operations per the rotary equipment involved, as the compressor and respective driver, and sometimes the whole evaporator as disclosed in the single stage apparatus of U.S. Pat. No. 6,695,951.

An exemplary two-stage embodiment of a multi-stage distillation apparatus includes a plurality of evaporators connected in series for staged operation in a rising film evaporation process wherein the evaporators are disposed in a compact concentric arrangement. The apparatus includes a first stage evaporator of ring shell and tube construction including a first annular vertical tube bundle, having tubes supported and sealed by a first upper tubesheet and a first bottom tubesheet. An external wall and an internal wall enclose the first tube bundle. The internal wall has an upward extension over the upper tubesheet and the external wall has a downward extension adjacent the bottom tubesheet and fastened to a base. The base includes a feed chamber communicating through the bottom tubesheet with the tubes of the first tube bundle for supplying the tubes with a flow of undistilled water for partial vaporization. The apparatus also includes means for conducting a heated liquid against the tubes of the first tube bundle and partially vaporizing the undistilled water therein. The first stage evaporator has a first stage vapor chamber above the upper tubesheet and in open communication with the tubes of the first tube bundle for receiving therefrom heated water vapor and residual undistilled water. The upward extension of the internal wall directs the heated vapor to a subsequent stage evaporator tube bundle. A final stage evaporator, which is also a pre-final stage condenser, includes a final cylindrical vertical tube bundle, having tubes supported and sealed by a final upper tubesheet and a final bottom tubesheet. The final bottom tubesheet carries a final stage floating head connected to receive, by gravity feed means from a final stage vapor chamber, residual undistilled water vacuumed from a prior stage evaporator to the final stage vapor chamber. The final floating head communicates with the tubes of the final stage evaporator cylindrical tube bundle for delivering the residual undistilled water there into. The final upper tubesheet has a diameter at least 30% larger than the final bottom tubesheet. The final upper tubesheet defines a lower wall of the final stage vapor chamber, in open communication with the final tube bundle for receiving therefrom additional water vapor for condensation to condensate and residual undistilled water for discharge from the distillation apparatus. A final external armor shell surrounds the final cylindrical tube bundle and engages the internal wall of an adjacent evaporator to direct heated vapor from the adjacent evaporator to pass through the final cylindrical tube bundle for heating the tubes and causing partial condensation of the heated vapor on the tubes of the final stage evaporator with the partial vaporization of the residual undistilled water in the tubes of the final tube bundle. Means for drawing off condensate from the partially condensed vapor from the final stage evaporator is also provided.

An exemplary three stage embodiment includes the first and final stage features of the two-stage version described above and adds a second stage evaporator and first stage condenser for heating the tubes and causing partial condensation of the heated vapor on the tubes of the final stage evaporator with the partial vaporization of the residual undistilled water in the tubes of the final tube bundle. The three stage embodiment further includes means for drawing off condensate from the partially condensed vapor from the final stage evaporator including a second intermediate vertical ring tube bundle having tubes supported and sealed by a second upper tubesheet and a second bottom tubesheet. The second bottom tubesheet carries a second stage floating head connected to receive, by gravity feed from a second stage vapor chamber above the second upper tubesheet, residual undistilled water vacuumed from the first stage evaporator to the second stage vapor chamber. The second stage floating head communicates with tubes of the second stage evaporator ring tube bundle for delivering the residual undistilled water thereinto. A second stage internal wall is welded to the second upper tubesheet. The second stage internal wall has an upward extension over the second upper tubesheet, and partially defining the second stage vapor chamber, which is open to communication with the second tube bundle for receiving therefrom additional water vapor for condensation to condensate and additional residual undistilled water. The second intermediate vertical ring tube bundle is disposed concentrically between the first annular vertical tube bundle of the shell and tube first stage evaporator and a subsequent vertical tube bundle of a subsequent evaporator. A second stage external armor shell surrounds the second ring tube bundle and engages the internal wall of the first stage evaporator to direct vapor from the first stage evaporator to pass through the second ring tube bundle for partial condensation of the heated vapor from the first stage tube bundle on the tubes of the second stage evaporator and the partial vaporization of the residual undistilled water in the tubes of the second ring tube bundle. Means for drawing off condensate from the partially condensed vapor from the second stage evaporator is also provided.

An exemplary four stage embodiment includes the first, second and final stage features of the three-stage version described above and adds a third stage evaporator and second stage condenser including a third intermediate vertical ring tube bundle, having tubes supported and sealed by a third upper tubesheet and a third bottom tubesheet. The third bottom tubesheet carries a third stage floating head connected to receive, by gravity feed means from a third stage vapor chamber above the third upper tubesheet, residual undistilled water vacuumed from the second stage evaporator to the third stage vapor chamber. The third stage floating head communicates with the tubes of the third stage evaporator ring tube bundle for delivering the residual undistilled water thereto. A third stage internal wall is welded to the third upper tubesheet. The third stage internal wall has an upward extension over the upper tubesheet, and partially defines the third stage vapor chamber. The third intermediate vertical ring tube bundle is disposed concentrically between the second intermediate vertical ring tube bundle and the final cylindrical vertical tube bundle of the final evaporator. A third stage external armor shell surrounds the third ring tube bundle and engages the second stage internal wall of the second stage evaporator to direct heated vapor from the second stage evaporator to pass through the third ring tube bundle for partial condensation of the heated vapor from the second stage evaporator on the tubes of the third ring tube bundle and the partial vaporization of the residual undistilled water in the tubes of the second ring tube bundle. Means for drawing off condensate from the partially condensed vapor from the third stage evaporator is also provided.

Intended to improve the performance and reduce the height dimensions of such distillers, the present invention was developed using rising film evaporators, in a multi-effect apparatus. The several evaporators are assembled in a concentric disposition, using a shell and tube exchanger for the first stage and a bundle of tubes for the succeeding stages, which are inserted one inside each other and connected in series on a horizontal base. If not developed on this disposition, this apparatus will need a pump to push sea water to the higher stages, and necessarily will have its dimensions increased upwardly and no reduction in height would be accomplished.

Through this constructive arrangement, the following advantages are achieved:
material reduction due to the absence of vapor pipelines;
vapor friction losses reduced to a minimum;
smaller size due to the compactness of the concentric disposition of evaporators;
no heat loss to exterior in the inner stages; and
cost effectiveness.

This unit can also be used to concentrate a mixture, using low temperature evaporative process.

The figures attached, are representative of four different models, showing their respective stages, all using the same constructive arrangement, here named concentric evaporators. The higher the number of stages the lower the energy consumption per volume produced. The choice for the number of stages, depend on the available heat, the fresh water rate desired and of course the involved costs.

The unit can be designed to produce any desired flow rate, meanwhile it is usual for this kind of equipment to have a production flow rate ranging from 5 until 120 m3/d.

The dimensions of a two stage 60 m3/d distiller have approximately 2.2 m height and 1.2 m in diameter.

DESCRIPTION OF THE DRAWINGS

The different models will now be exemplified with reference to the accompanying drawings briefly described hereafter.

FIG. 1 is the elevation view in cross section of the two stage model totally assembled;
FIG. 2 is the top view of the first stage evaporator here named Ring Shell and Tube Evaporator;
FIG. 3 is the elevation view in cross section of the Ring Shell and Tube Evaporator;
FIG. 4 is the top view of the second stage evaporator, here named Cylindrical Bundle Evaporator, that is the ultimate stage;
FIG. 5 is the elevation view in cross section of the Cylindrical Bundle Evaporator;
FIG. 6 is the bottom view of the floating head of the Cylindrical Bundle Evaporator;
FIG. 7 is the top view of the condenser inserted into the superior chamber;
FIG. 8 is the elevation view in cross section of the condenser;
FIG. 9 is the condenser front view;
FIG. 10 is the elevation view in cross section of the three stage model totally assembled;
FIG. 11 is the elevation view in cross section of the first stage of the three stage model, or the Ring Shell and Tube Evaporator;
FIG. 12 is the base support for intermediate stage, where A is the top view and B is a cross section view;
FIG. 13 is the elevation view in cross section of the intermediate stage, here named Ring Bundle Evaporator;
FIG. 14 is the bottom view of the floating head of the Ring Bundle Evaporator;
FIG. 15 is the cross section of FIG. 14.

DETAILED DESCRIPTION OF THE INVENTION

The following description refers to FIGS. 1 to 9, all related to the two stage model, the operational philosophy of which extends to the other models.

Figure 1:
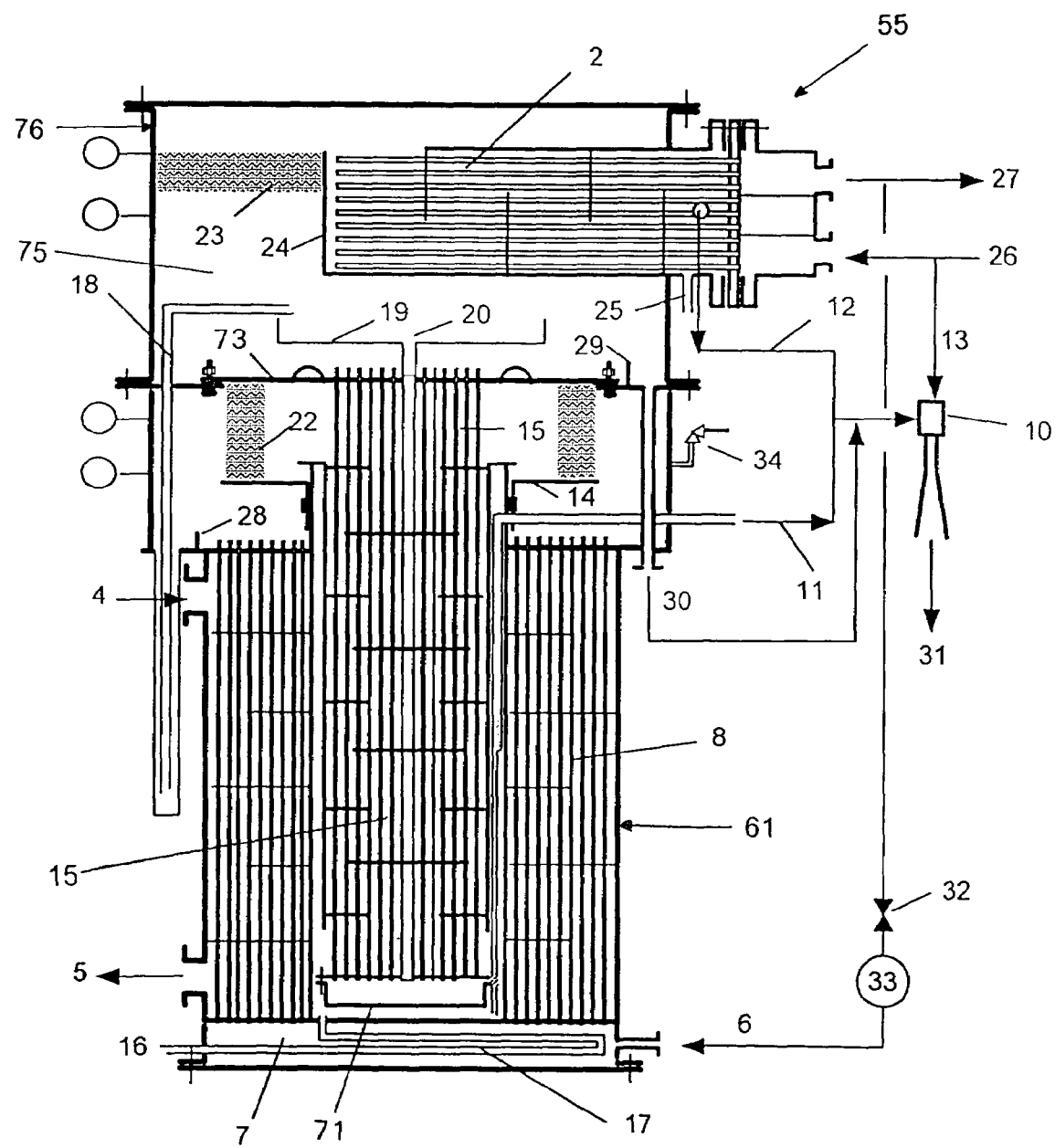
FIGS. 1 to 9 are representative of the two stage model.
Figure 3:
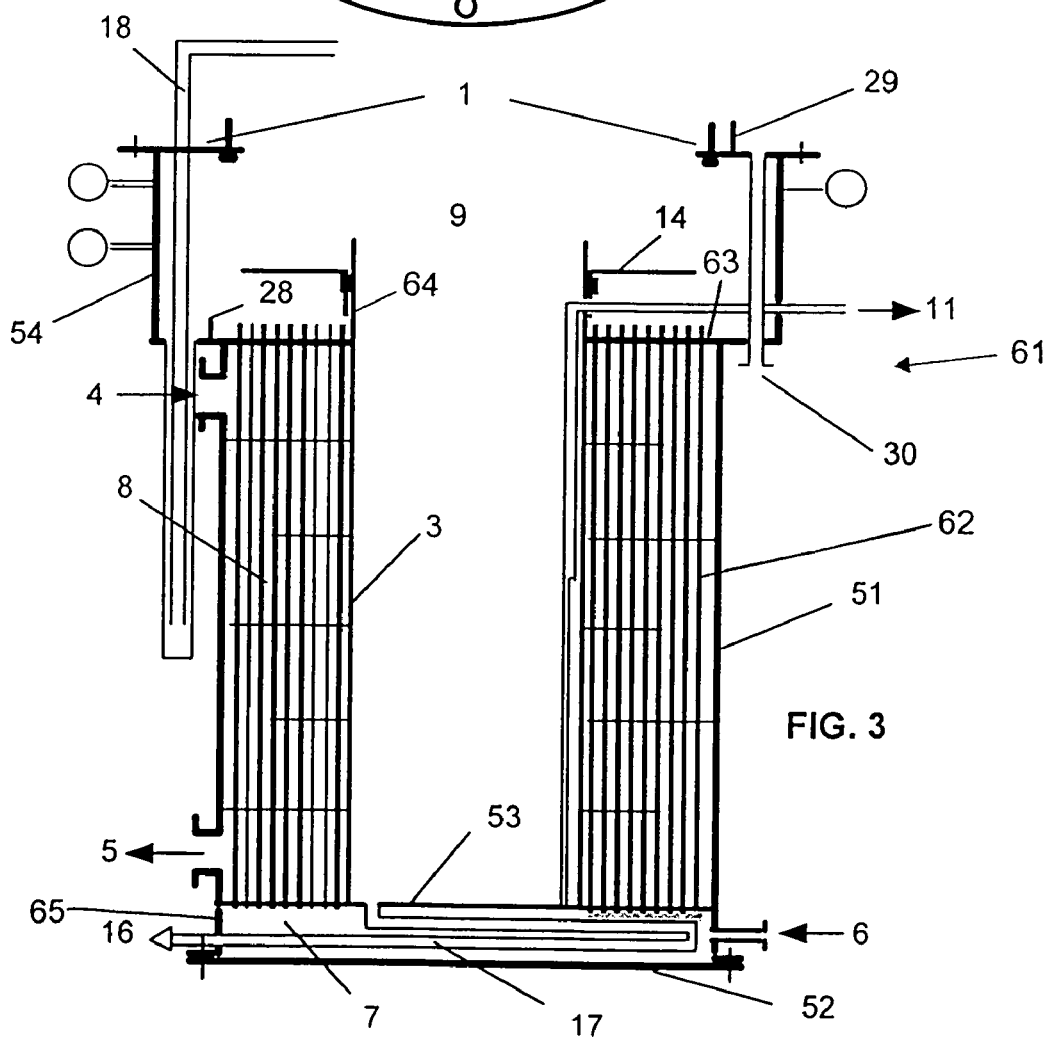
Figure 4:
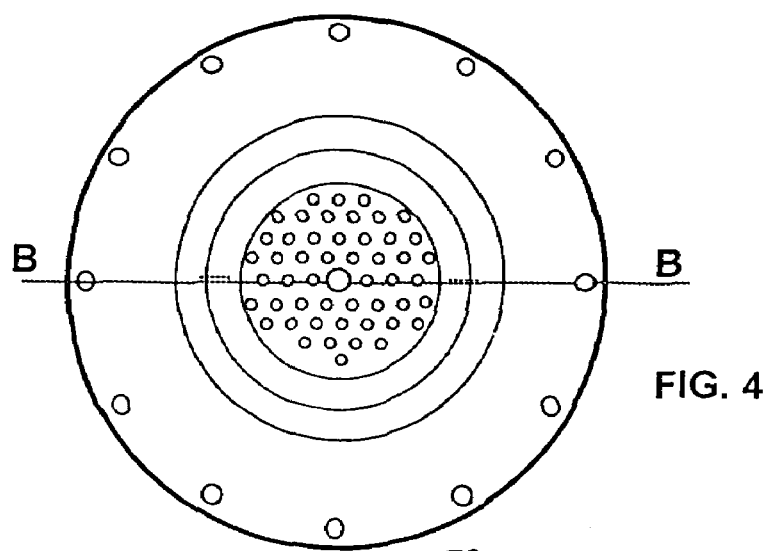
Figure 5:
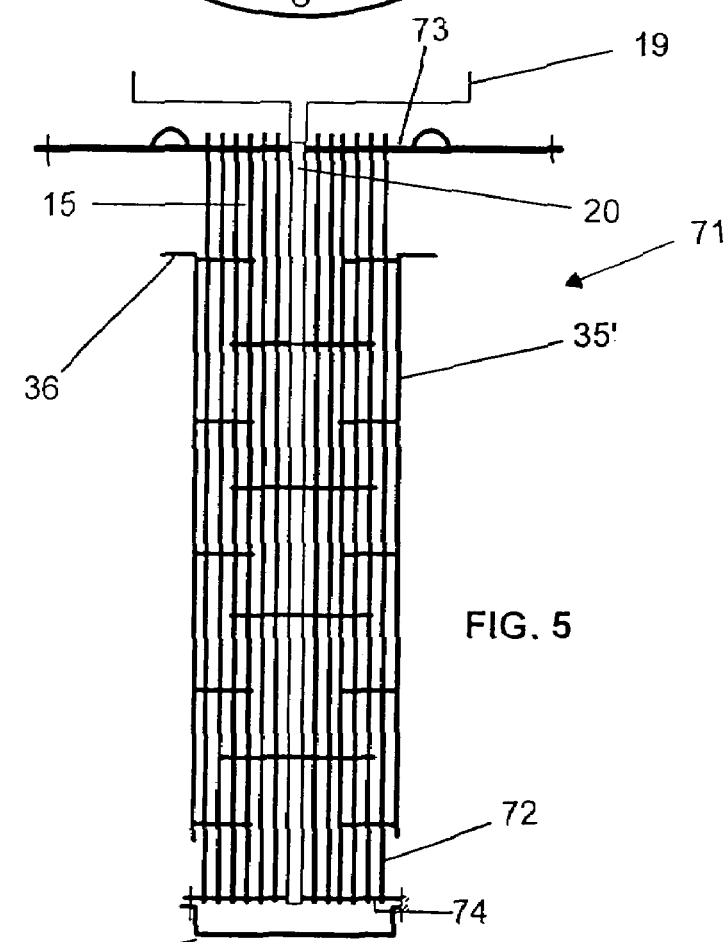
Figure 6:
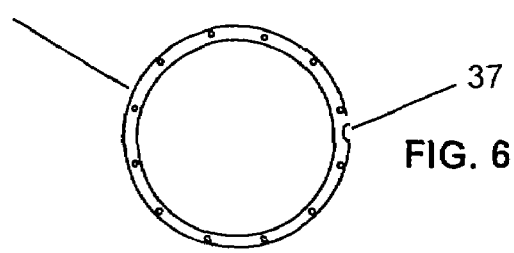
Figure 7:
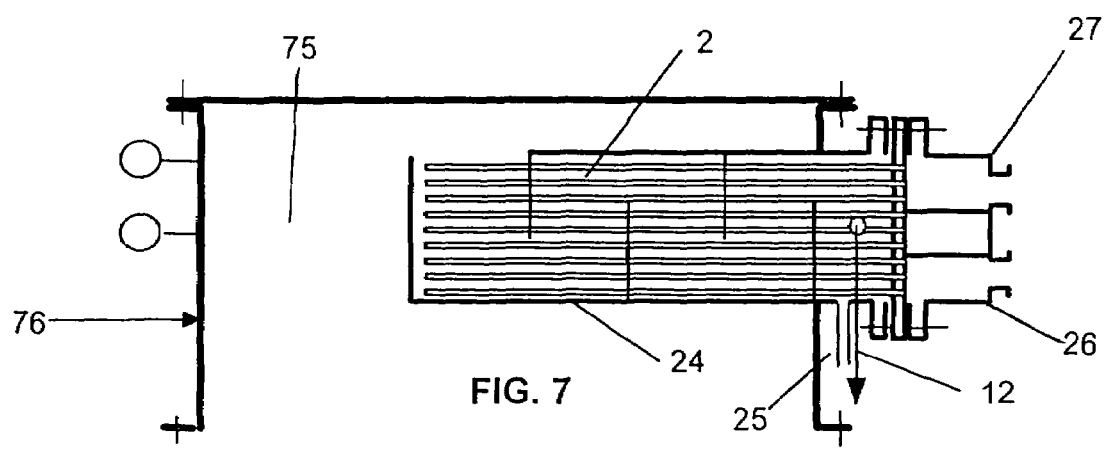
Figure 8:
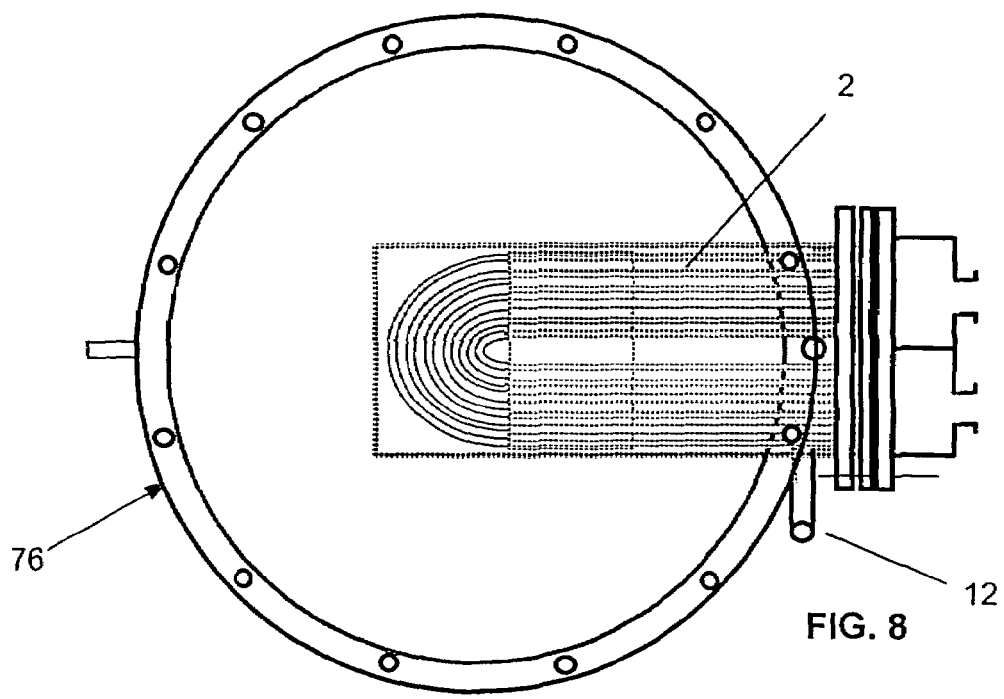
Figure 9:
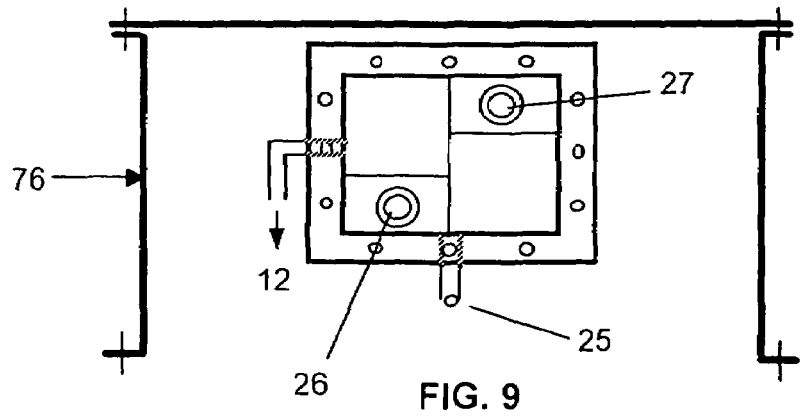
Figure 10:
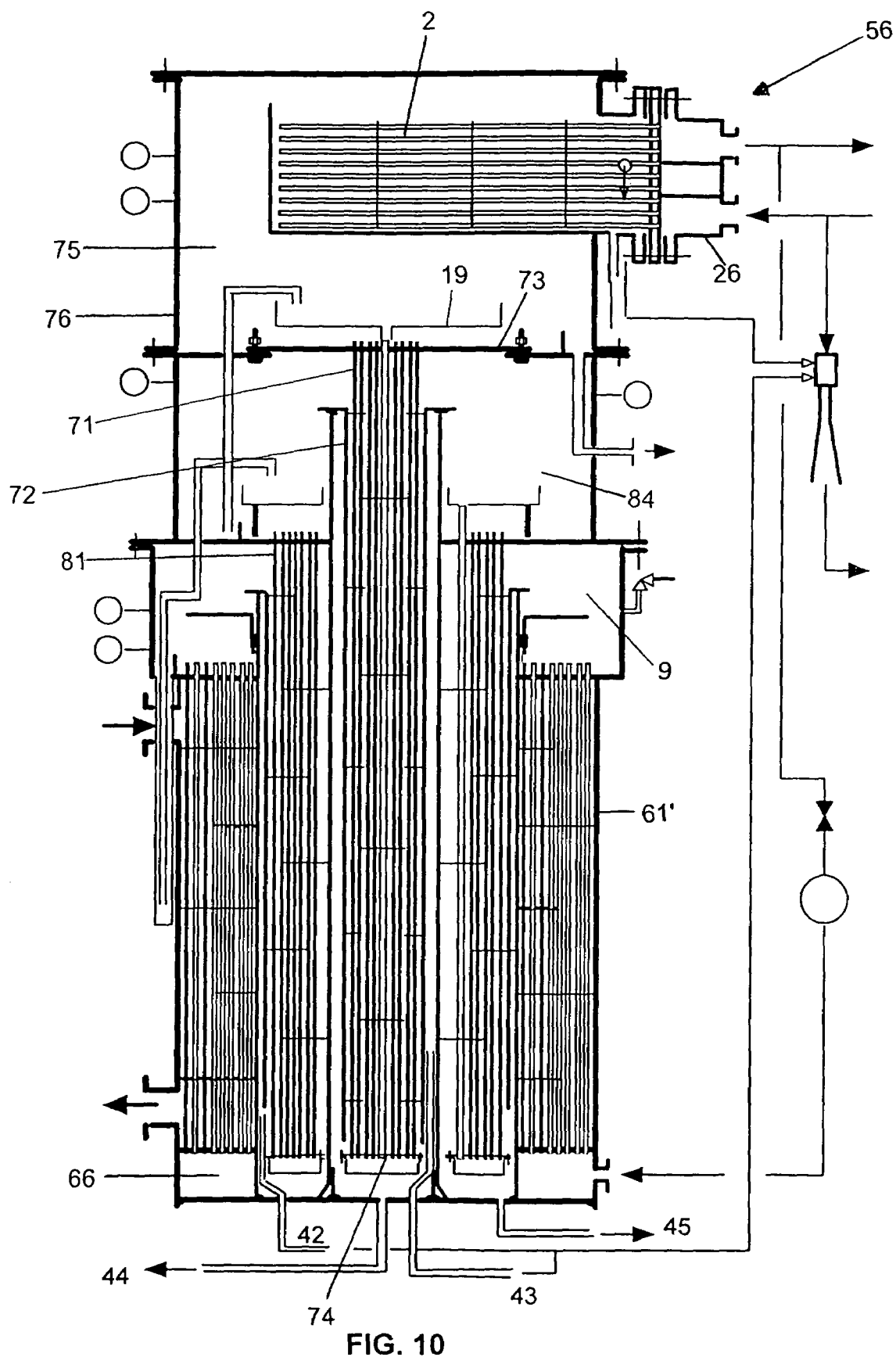
FIGS. 10 to 15 are representative of the three stage model.
Figure 11:
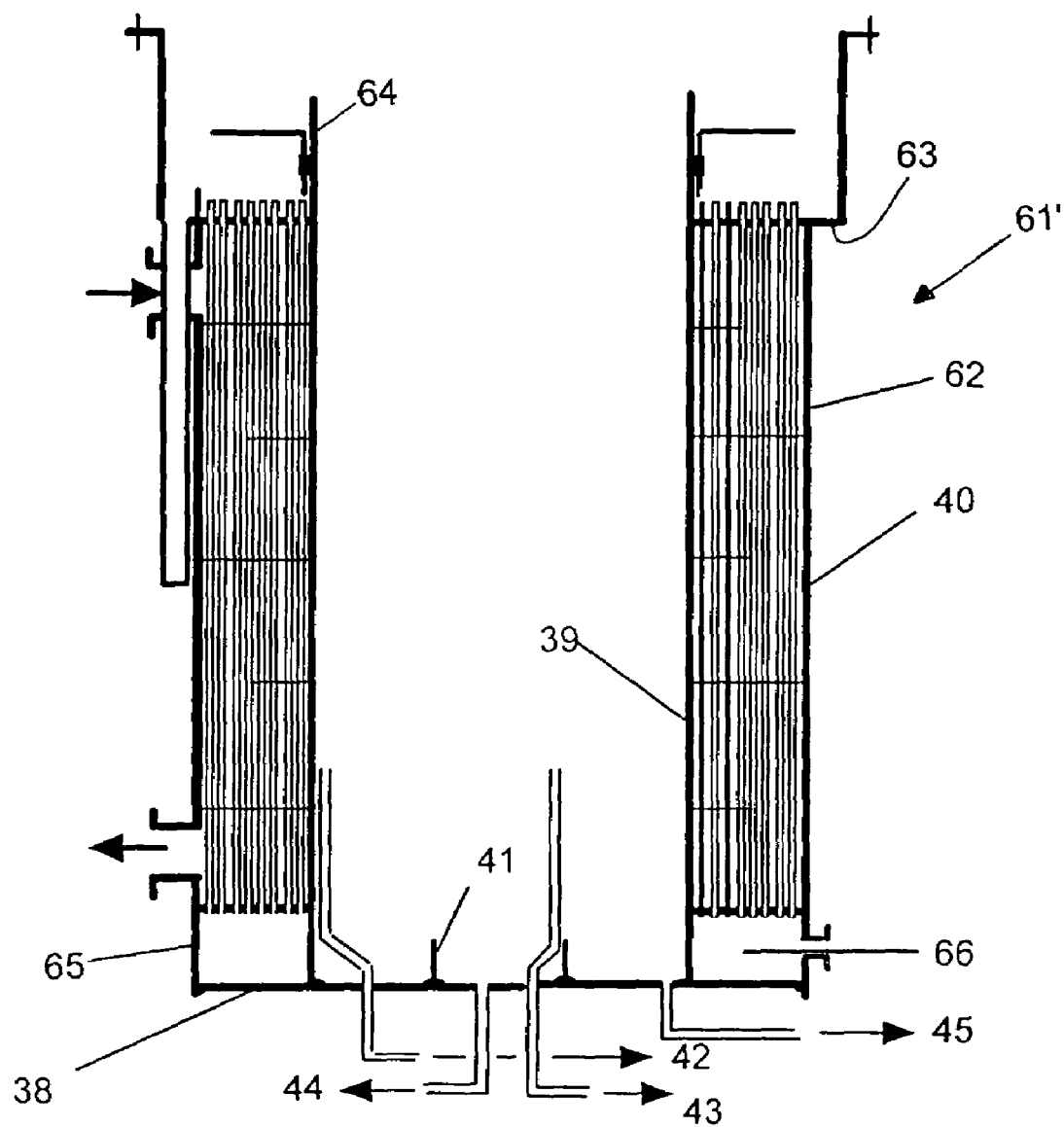
Figure 12:
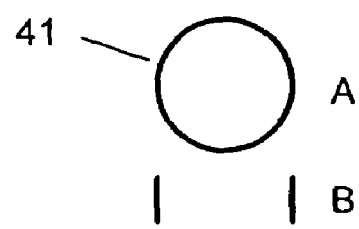

FIG. 1 shows the two stage model 55 with its evaporators 61, 71 assembled in the concentric arrangement where is observed that the final stage evaporator 71 (FIG. 5) is assembled inside the first stage evaporator 61 (FIG. 3), supported and bolted at the flange 1 (FIG. 3). The concentric stages are connected for operation in series, as is the case for the other models to be subsequently described. A gasket is used to avoid leakage. The final stage upper vessel 76, enclosing the final stage upper vapor chamber 75 (FIG. 7) with the condenser 2 inside, is assembled bolted in the same flange 1.

Figure 2:
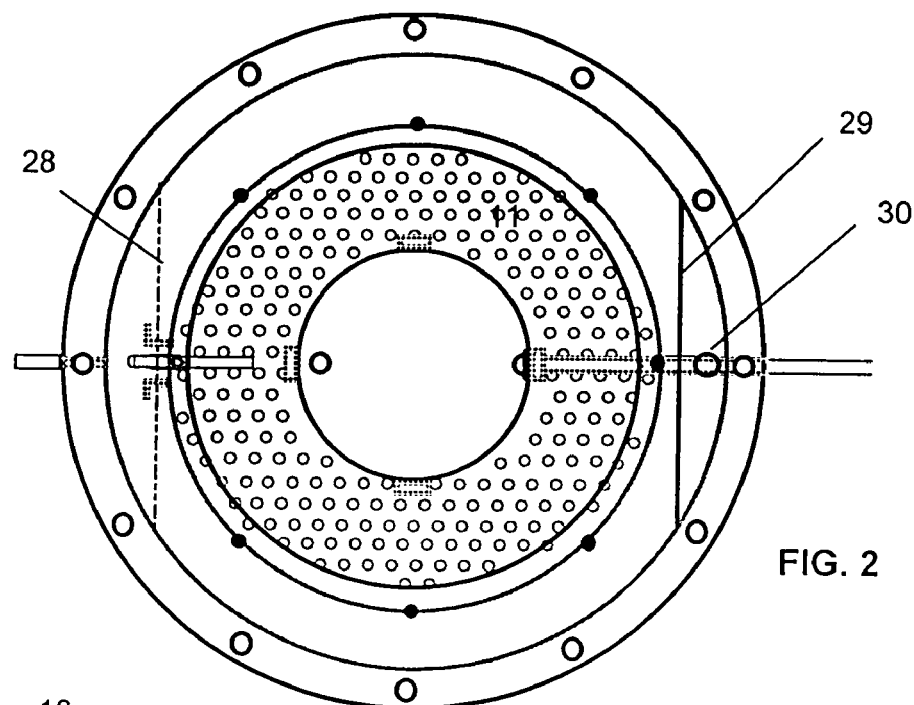

On FIGS. 2 and 3, is observed that the first stage evaporator 61 is constituted of a shell and tube exchanger without part of the central tubes, here called Ring Shell and Tube Evaporator. The internal wall 3 and the external wall 51 enclose the hot water throughout the interior of the shell, returning for heating on outlet 5.

Salt water feeds the first stage evaporator 61 annular vertical tube bundle 62 on nozzle 6, passing throughout the feed chamber 7, constituted by a downward extension 65 of the external wall 51, limited on the bottom by flange 52 and on top by tubesheet 53. Feed water is directed to the first stage tubes 8, receiving enough heat from hot water inlet 4, until boiling. Heat is furnished so that only part of the water is vaporized in order to avoid excessive scales into the tubes. It is observed on FIG. 3 that the vapor chamber 9 above the first upper tubesheet 63 of the first stage evaporator 61 is enlarged in order to permit the passage of the vapor to the first stage vapor chamber 9 (FIG. 3). Vapor chamber 9 is limited laterally by cylindrical shell 54, on top by flange 1 and the final upper tubesheet 73 of the final stage evaporator 71, and on bottom by the first bottom tubesheet 53.

Hot water temperature 4 is heated at maximum 88° C. in order to avoid excessive scales into the tubes. Operating evaporative temperature ranges from 60 to 65° C. on the first stage and from 45 to 50° C. on the second. To obtain these evaporating temperatures, the pressure must be evacuated and controlled in the range of 20.0 to 25.0 kpa abs at the first stage and in the range of 9.9 to 12.4 kpa abs at the second stage. Vacuum is obtained by an eductor 10 (FIG. 1) that sucks the non condensable gases like air and carbon dioxide through the first stage vacuum outlet 11, and second stage vacuum outlet 12. Salt water at a specific designed pressure 13 (FIG. 1) is used to drive the eductor.

Boiling water and vapor rises into the tubes 8, splashing on the plate 14 (FIG. 3). Vapor flows to the final stage evaporator tubes 15 (FIGS. 1 and 5) supported and sealed between a final upper tubesheet 73 and a final bottom tubesheet 74 in the final cylindrical vertical tube bundle 72 of the final stage evaporator 71, here named Cylindrical Bundle Evaporator. Touching the outside of the tube walls, the vapor condenses, giving up energy to boil the final stage salt water within the tubes 15. The condensate produced on the outside of the tube walls is collected on the bottom of the chamber 9 (FIG. 3) and pumped to a storage tank through the coil 17 and the outlet 16, delivering sensible heat to the incoming salt water 6 through the coil 17, inside chamber 7.

Final stage is fed by the remaining not vaporized first stage salt water, suctioned by the final stage lower pressure through tube 18, pouring into the tray 19, and flashing vapor. Tube 18 collects salt water from the bottom of an extended pipe, in order to keep an adequate water column, to avoid suction of vapor from the first stage. On the tray, water directs to the central tube 20, dropping to floating head 21, feeding final stage tube bundle 72. Central tube 20 has also the function to force a circulation of liquids to all tubes of the evaporator. Tray 19 and plate 14 prevent rising salt water droplets to reach the demisters 22 (first stage) and 23 (final stage). Both plate 14 and tray 19 are removable in order to permit access to the tube sheets.

Final stage fresh water is obtained through the vapor condensation on condenser 2, being collected in the container 24 within the final vapor chamber 75 contained in the final stage upper vessel 76. Through outlet nozzle 25 (FIG. 1), distilled water condensate is pumped to reservoir. Inside condenser tubes circulate cold salt water through inlet nozzle 26 (FIG. 1), leaving on nozzle outlet 27. Here, a stream of salt water is derived in order to feed the first stage feed chamber 7 through inlet nozzle 6.

Level of residual undistilled salt water is maintained on the first stage upper tubesheet 63 of the first stage evaporator 61 by the weir 28. In the same way, final stage residual water level is maintained on the final upper tubesheet 73 by weir 29. Salt water that overboards weir 29 exits the unit through outlet 30, being suctioned by eductor 10 (FIG. 1) to discharge 31 (FIG. 1).

Nominal flow rate is obtained through control valve 32 and flow meter 33 (FIG. 1). Instruments as thermometers and manometers are used for operational control, and a pressure safety relief valve 34 installed on the first stage grants against over pressure.

A thin steel shell 35 (FIG. 5), here named final stage armor 35, which is assembled in two halves by flanges, encloses the final stage cylindrical vertical tube bundle 72. The role of this armor 35 is to direct the vapor from the first stage evaporator tubes 8 to pass from the first stage vapor chamber 9 through the final cylindrical vertical tube bundle 72 in the final stage evaporator 71, partially condensing on the outsides of the final stage evaporator tubes 15, avoiding being suctioned directly to vacuum pipe 11 (FIG. 1). The welded edge 36 (FIG. 5) supports the armor 35 at the top of the first stage internal wall 39. A gasket bonded below the edge avoids vapor leakage.

A cut 37 (FIG. 6) made at the bottom tube sheet and at the floating head 21, permits the passage of the fixed vacuum pipe 11.

The following description is refereed to FIGS. 10 to 16 of the three stage model.

Figure 13:
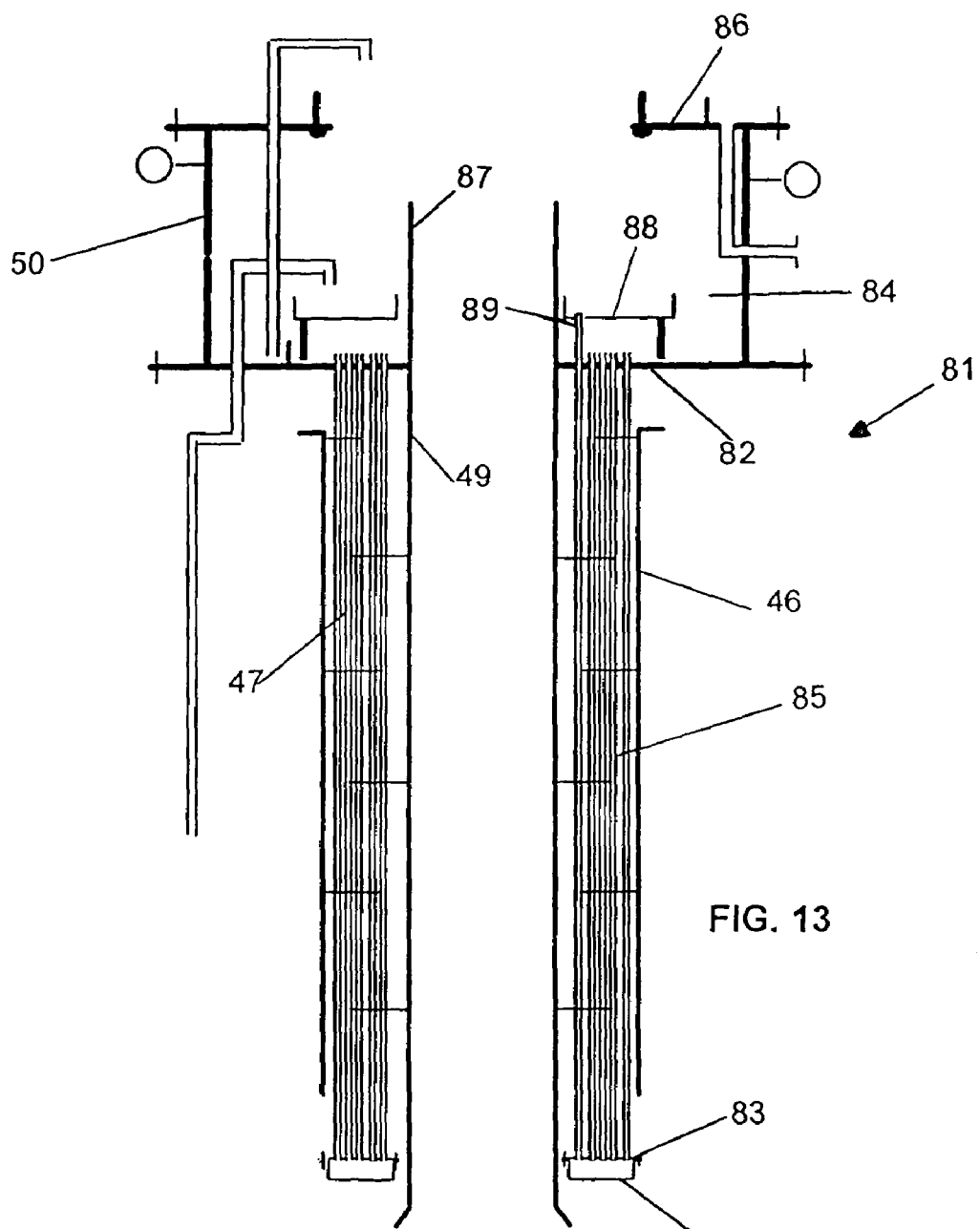
Figure 14:
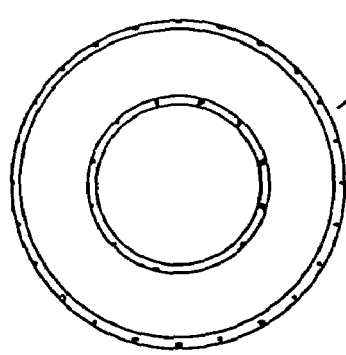
Figure 15:
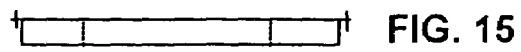

A three stage model 56 (FIG. 10) has the same two stage constructive philosophy, with a new intermediate stage evaporator included, here named Ring Evaporator Bundle (FIG. 13), that becomes the second stage evaporator 81 with ring tube bundle 47, and is inserted into the first stage evaporator 61. The cylindrical evaporator (FIG. 5), becomes now the third stage, but remains the final stage evaporator 71 of the model 56, and is inserted into the second stage ring tube bundle 47 (FIG. 13).

The first stage evaporator 61' of this three stage model 56 (FIGS. 10, 11) is similar to the two stage model 55, but the base 38 (FIG. 11) is now welded to the internal and external shells walls 39 and 40 respectively (FIG. 11), in order to have a reliable watertight. At the center of this base 38 is welded a support 41 (FIGS. 11 and 12), in order to hold and centralize the intermediate second stage (FIG. 13).

On this model 56, vacuum lines 42 and 43 (FIG. 11) and condensate (distillate) outlets 44 and 45, are located below the unit, in order to permit easy access of second and third stages.

Heat exchange is accomplished through a 15 to 20° C. differential temperature between stages.

The second stage evaporator 81 ring tube bundle 47 has also an armor 46 (FIG. 13), in order to direct the first stage vapor to the tubes 85 of its tube bundle 47. Floating head 48 has in this way a ring format also, as shown on FIG. 14 (bottom view) and FIG. 15 (section view). An internal wall 49 with upward extension 87 and an external shell 50 enclose the second stage vapor chamber 84 and isolate the vapor inside this stage.

An annular tray 88 above the second upper tubesheet 82 acts as a splash guard for vapor and salt water discharged from the second stage tubes 85 into the second stage vapor chamber 84. The tray 88 also receives residual salt water vacuumed from the previous stage vapor chamber 9 and drains the water through a tube 89 to a floating head 48 carried on the second bottom tubesheet 83, from which the residual salt water is drawn into tubes 85. Vapor from the previous first stage vapor chamber 9 is directed by a second stage armor 46, surrounding the tube bundle 47, to pass through the tube bundle 47, discharging heat to the salt water in the tubes 85 to partially vaporize the water therein and deliver vapor and residual salt water to the second stage vapor chamber 84. Some of the vapor contacting the outside of the tubes 47 condenses thereon and drains to the bottom of the second stage evaporator 81, where it is drawn off as condensate through a condensate outlet 45 and pumped to storage.

The material used in the unit needs to be corrosive resistant to salt water as aluminium bronze, monel, copper nickel, and titanium.

A one stage desalinator can be assembled by just inserting the condenser 2 inside vapor chamber 9.

Figure 16:
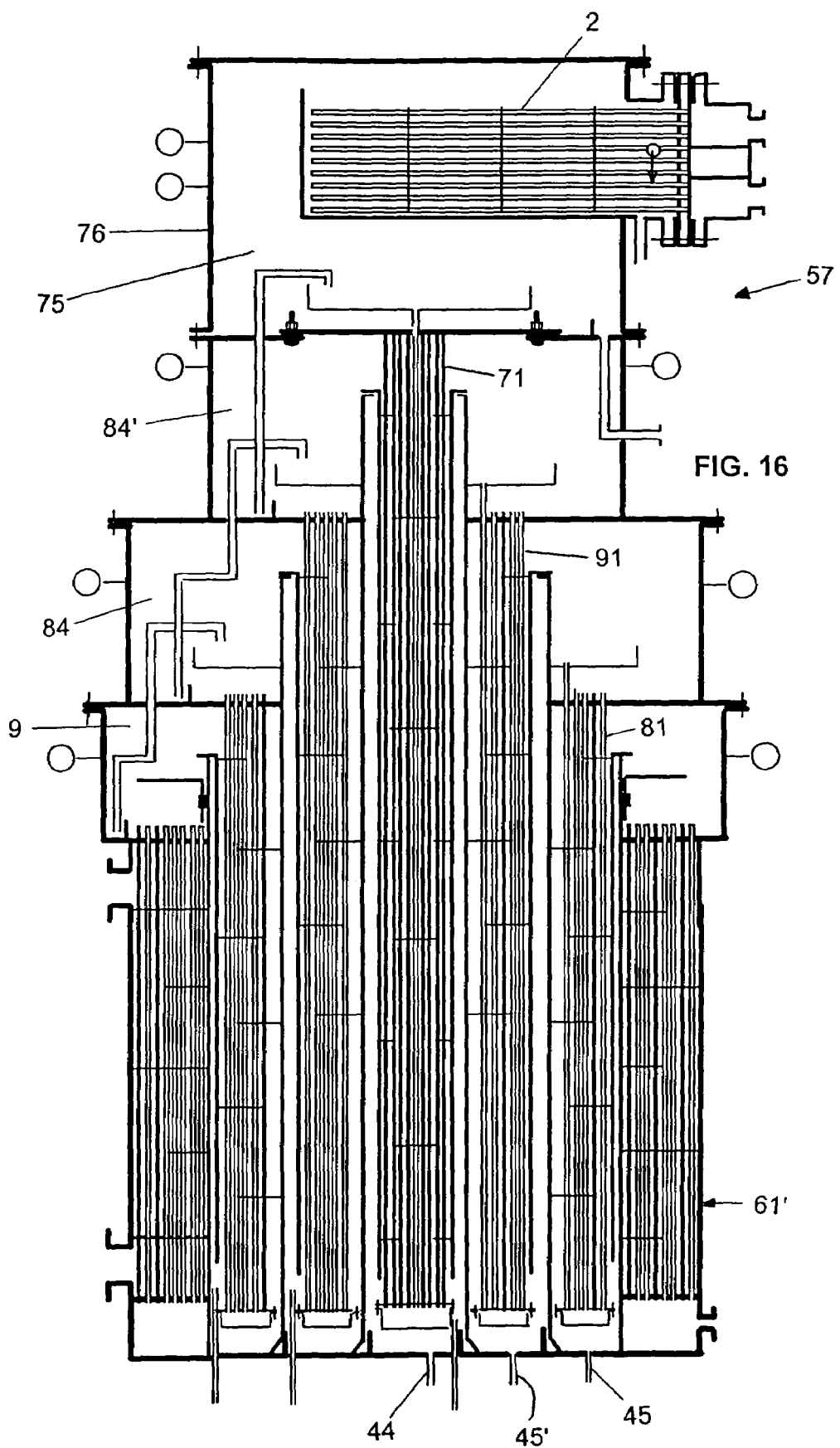
FIG. 16 is the elevation view in cross section of the four stage model.

A four stage model 57 including a third stage evaporator 91 is represented in a section view on FIG. 16. Now, another third stage evaporator 91 ring tube bundle 47' is included, as an intermediate stage between the second stage evaporator 81 and the final stage evaporator 71 of the four stage model 57, compounding in this way the four stage model, and so on.

In the four stage model 57, the illustrated third stage evaporator 91 with the third ring tube bundle 47' and the second stage evaporator 81 with the second ring tube bundle 47 are identical, except for their dimensions. The second ring tube bundle is of larger diameter and the third ring tube bundle is of longer length than in the three stage model, as required by the configuration of the four stage model 57 illustrated in FIG. 16.

Figure 17:
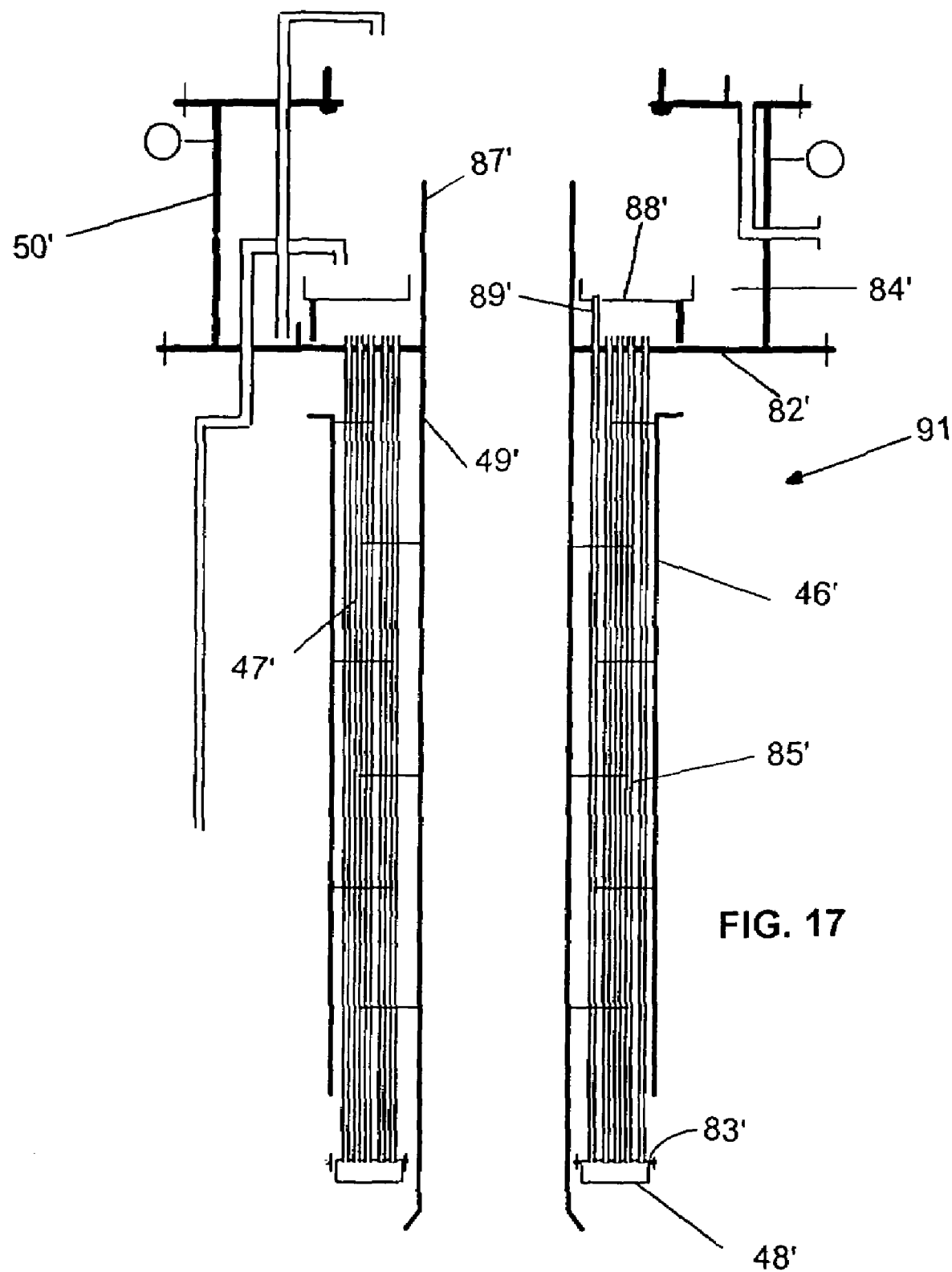
FIG. 17 is a cross-sectional view similar to FIG. 13 but representing the third stage evaporator of a four stage model.

FIG. 17 of the drawings illustrates the third stage evaporator 91 wherein primed numerals indicate features equivalent to those of the second stage evaporator 81 and the third ring tube bundle 47', except for dimensions, which are varied to suit. Thus, the third ring tube bundle 47' includes a third upper tubesheet 82' and a third bottom tubesheet 83', which seal and support opposite ends of the tubes 85' of the bundle. A third stage vapor chamber 84' is defined above the third upper tubesheet 82' and annularly around the upward extension 87' of the third stage internal wall 49'. The third stage vapor chamber 84' is laterally restrained by an outer shell 50' and on top by flange 1 and final upper tubesheet 73 of the final stage evaporator 71.

An annular tray 88' above the third upper tubesheet 82' acts as a splash guard for vapor and salt water discharged from the third stage tubes 85' into the third stage vapor chamber 84'. The tray 88' also receives residual salt water vacuumed from the previous stage vapor chamber and drains the water through a tube 89' to a floating head 48' carried on the third bottom tubesheet 83'. Vapor from the previous second stage vapor chamber 84 is directed by a third stage armor 46', surrounding the tube bundle 47', to pass through the tube bundle 47', discharging heat to the salt water in the tubes 85' to partially vaporize the water therein and deliver vapor and residual salt water to the third stage vapor chamber 84'. Some of the vapor contacting the outside of the tubes 47' condenses thereon and drains to the bottom of the third stage evaporator 91, where it is drawn off as condensate through a condensate outlet 45' and pumped to storage.

It should be understood that the operation of the second and third stage evaporators is consecutive and identical. The second stage receives first stage vapor into its tube bundle 47, which is partially condensed on the second stage tubes 85 and condensate is drawn off from the condensate outlet 45 and pumped to storage. The residual salt water from the second stage is suctioned to the third stage vapor chamber 84', passed to the third stage floating head 46', drawn upward through the third stage evaporator tubes 85' and heated therein by the second stage vapor to form more vapor and residual salt water for use in the final stage evaporator 71.

The invention claimed is:

1. A multi-stage distillation apparatus includes a plurality of evaporators connected in series for staged operation in a rising film evaporation process wherein the evaporators are disposed in a compact concentric arrangement, the apparatus comprising:

a first stage evaporator of ring shell and tube construction including a first annular vertical tube bundle, having tubes supported and sealed by a first upper tubesheet and a first bottom tubesheet, an external wall and an internal wall enclosing the first tube bundle, said internal wall having an upward extension over the upper tubesheet and the external wall having a downward extension adjacent the bottom tubesheet and fastened to a base, the base including a feed chamber communicating through the bottom tubesheet with the tubes of the first tube bundle for supplying the tubes with a flow of undistilled water for partial vaporization, means for conducting a heated liquid against the tubes of the first tube bundle and partially vaporizing the undistilled water therein, and the first stage evaporator having a first stage vapor chamber above the upper tubesheet and in open communication with the tubes of the first tube bundle for receiving therefrom heated water vapor and residual undistilled water, the upward extension of the internal wall directing the heated vapor to a subsequent stage evaporator tube bundle; and a final stage evaporator, being also a pre-final stage condenser, including a final cylindrical vertical tube bundle, having tubes supported and sealed by a final upper tubesheet and a final bottom tubesheet, the final bottom tubesheet carrying a final stage floating head connected to receive, by gravity feed means from a final stage vapor chamber, residual undistilled water vacuumed from a prior stage evaporator to the final stage vapor chamber, the final floating head communicating with the tubes of the final stage evaporator cylindrical tube bundle for delivering said residual undistilled water thereinto, the final upper tubesheet having a diameter at least 30% larger than the final bottom tubesheet, the final upper tubesheet defining a lower wall of the final stage vapor chamber, in open communication with the final tube bundle for receiving therefrom additional water vapor for condensation to condensate and residual undistilled water for discharge from the distillation apparatus, and a final external armor shell surrounding the final cylindrical tube bundle and engaging the internal wall of an adjacent evaporator to direct heated vapor from the adjacent evaporator to pass through the final cylindrical tube bundle for heating the tubes and causing partial condensation of the heated vapor on the tubes of the final stage evaporator with said partial vaporization of the residual undistilled water in the tubes of the final tube bundle, and further including means for drawing off condensate from the partially condensed vapor from the final stage evaporator.

2. An apparatus as in claim 1 and further including:

a second stage evaporator and first stage condenser including a second intermediate vertical ring tube bundle, having tubes supported and sealed by a second upper tubesheet and a second bottom tubesheet, the second bottom tubesheet carrying a second stage floating head connected to receive, by gravity feed from a second stage vapor chamber above the second upper tubesheet, residual undistilled water vacuumed from the first stage evaporator to the second stage vapor chamber, the second stage floating head communicating with tubes of the second stage evaporator ring tube bundle for delivering said residual undistilled water thereinto, a second stage internal wall welded to the second upper tubesheet, said second stage internal wall having an upward extension over the second upper tubesheet, and partially defining the second stage vapor chamber, which is open to communication with the second tube bundle for receiving therefrom additional water vapor for condensation to condensate and additional residual undistilled water; said second intermediate vertical ring tube bundle being disposed concentrically between the first annular vertical tube bundle of the shell and tube first stage evaporator and a subsequent vertical tube bundle of a subsequent evaporator, and a second stage external armor shell surrounding the second ring tube bundle and engaging the internal wall of the first stage evaporator to direct vapor from the first stage evaporator to pass through the second ring tube bundle for partial condensation of the heated vapor from the first stage tube bundle on the tubes of the second stage evaporator and said partial vaporization of the residual undistilled water in the tubes of the second ring tube bundle, and further including means for drawing off condensate from the partially condensed vapor from the second stage evaporator.

3. An apparatus as in claim 2 wherein said second stage vapor chamber is laterally limited by a second cylindrical shell and on top by a connection flange and an external armor shell is disposed surrounding the second intermediate vertical ring tube bundle.

4. An apparatus as in claim 2 and further including:
a third stage evaporator and second stage condenser including a third intermediate vertical ring tube bundle, having tubes supported and sealed by a third upper tubesheet and a third bottom tubesheet, the third bottom tubesheet carrying a third stage floating head connected to receive, by gravity feed means from a third stage vapor chamber above the third upper tubesheet, residual undistilled water vacuumed from the second stage evaporator to the third stage vapor chamber, the third stage floating head communicating with the tubes of the third stage evaporator ring tube bundle for delivering said residual undistilled water thereto, a third stage internal wall welded to the third upper tubesheet, said third stage internal wall having an upward extension over the third upper tubesheet, and partially defining the third stage vapor chamber; said third intermediate vertical ring tube bundle being disposed concentrically between said second intermediate vertical ring tube bundle and the final cylindrical vertical tube bundle of the final evaporator, and a third stage external armor shell surrounding the third ring tube bundle and engaging the second stage internal wall of the second stage evaporator to direct heated vapor from the second stage evaporator to pass through the third ring tube bundle for partial condensation of the heated vapor from the second stage evaporator on the tubes of the third ring tube bundle and said partial vaporization of the residual undistilled water in the tubes of the second ring tube bundle, and further including means for drawing off condensate from the partially condensed vapor from the third stage evaporator.

5. An apparatus as in claim 4 wherein said base contains a cylindrical welded support and welded tubes; said third stage vapor chamber is laterally limited by a third cylindrical shell and said feed chamber is limited on bottom by the base and laterally by extensions of internal and external walls.

6. An apparatus as in claim 1 wherein the external wall is fastened to the base by bolting or welding.

7. An apparatus as in claim 1 wherein the first stage vapor chamber is laterally limited by a cylindrical shell and on top by a flange, the feed chamber is laterally limited by the downward extension of a first external wall, and at the bottom by the base, and on top by a plate, wherein the first upper tubesheet has a diameter larger than the diameter of the first external wall.

8. An apparatus for seawater or brackish water desalination as in claim 1.

9. An apparatus as in claim 8 wherein the final stage vapor chamber is enclosed by an upper vessel closed on the top and containing a final condenser for obtaining distilled water from a final condenser stage of the apparatus.

10. An apparatus as in claim 9 including means for cooling the final condenser with cold salt water and to drive an eductor for obtaining vacuum in the first stage evaporator, the final stage evaporator, the pre-final stage condenser and the final condenser.

11. An apparatus as in claim 9 including means for admitting hot water as an energy source for the first stage evaporator of the apparatus.

12. An apparatus as in claim 9 including means for conducting fresh water from the apparatus to storage.

* * * * *